US012756103B2

(12) United States Patent
Takano et al.

(10) Patent No.: US 12,756,103 B2
(45) Date of Patent: Oct. 6, 2026

(54) RFID TAG AND ANTENNA PATTERN

(71) Applicant: TOPPAN Holdings Inc., Tokyo (JP)

(72) Inventors: Hiroki Takano, Tokyo (JP); Shosei Asaka, Tokyo (JP); Keinosuke Yamaoka, Tokyo (JP); Noriaki Higuchi, Tokyo (JP)

(73) Assignee: TOPPAN HOLDINGS INC., Tokyo (JP)

( * ) Notice: Subject to any disclaimer, the term of this patent is extended or adjusted under 35 U.S.C. 154(b) by 19 days.

(21) Appl. No.: 18/918,079

(22) Filed: Oct. 17, 2024

(65) Prior Publication Data

US 2025/0132498 A1 Apr. 24, 2025

(30) Foreign Application Priority Data

Oct. 20, 2023 (JP) ................................ 2023-181093
Sep. 5, 2024 (JP) ................................ 2024-153079

(51) Int. Cl.
*H01Q 9/26* (2006.01)
*H01Q 1/22* (2006.01)

(52) U.S. Cl.
CPC ........... *H01Q 9/265* (2013.01); *H01Q 1/2208* (2013.01)

(58) Field of Classification Search
CPC ........ H01Q 9/265; H01Q 1/2208; H01Q 9/24; H01Q 1/2225
See application file for complete search history.

(56) References Cited

U.S. PATENT DOCUMENTS

2006/0055542 A1* 3/2006 Forster .................... H01Q 5/48 340/572.7
2007/0200782 A1* 8/2007 Hayama ............... H01Q 1/2208 343/700 MS
2020/0373674 A1* 11/2020 Escaro .................... H01Q 9/26

FOREIGN PATENT DOCUMENTS

EP 3938959 B1 * 9/2025 ............... H01Q 1/38
JP 6941069 B2 9/2021

* cited by examiner

*Primary Examiner* — Seung H Lee
(74) *Attorney, Agent, or Firm* — XSENSUS LLP

(57) ABSTRACT

An antenna pattern includes a base material, and a dipole antenna formed in a band shape, made of a conductive material on a front surface of the base material, and extending linearly. The dipole antenna has a connection portion positioned in the middle of the dipole antenna in a longitudinal direction, and to which an IC chip is connected. A pair of long sides of the dipole antenna positioned at both ends of the dipole antenna in a width direction and extending in the longitudinal direction of the dipole antenna are formed in waveform shapes in which a plurality of concave and convex shapes are arranged in the longitudinal direction.

12 Claims, 2 Drawing Sheets

RFID TAG AND ANTENNA PATTERN

CROSS-REFERENCE TO RELATED APPLICATIONS

The present application claims priority to Japanese Patent Application No. 2023-181093, filed on Oct. 20, 2023 and Japanese Patent Application No. 2024-153079, filed on Sep. 5, 2024, the entire contents of each of which are incorporated herein by reference.

BACKGROUND OF THE INVENTION

Field of the Invention

The present invention relates to an RFID tag and an antenna pattern.

Description of Related Art

In related art, a radio frequency identification (RFID: individual identification by radio waves) technology for wirelessly writing and reading a large amount of information in a non-contact manner has been used in various fields such as identification management of products and the like, IT and automation systems in offices and factories, and the like.

Japanese Patent No. 6941069 discloses, as an antenna pattern applied to RFID in a UHF band, an antenna pattern having a dipole antenna formed on a front surface of a base material and a sub-element formed on a back surface of the base material. In the antenna pattern of Japanese Patent No. 6941069, a dipole antenna including meandering meanders is adopted, and thus, a longer communication distance of radio waves is secured while an increase in a size of the antenna pattern is suppressed. In addition, the antenna pattern of Japanese Patent No. 6941069 has the sub-element in addition to the dipole antenna including the meander, and thus, a favorable gain is obtained not only in a direction intersecting a direction in which the dipole antenna extends but also in a direction in which the dipole antenna extends. That is, in the antenna pattern of Japanese Patent No. 6941069, directivity is improved to expand a direction and a range in which transmission and reception can be performed such that wireless communication in all directions can be performed favorably.

SUMMARY OF THE INVENTION

However, in the antenna pattern of Japanese Patent No. 6941069, it is necessary to form the sub-element in addition to the dipole antenna. Thus, there is a problem in that cost (particularly, material cost) required for manufacturing the antenna pattern is increased or the manufacturing of the antenna pattern is complicated.

In view of the above-described problems, an object of the present invention is to provide an antenna pattern that is easily manufactured at low cost while the communication distance of radio waves and the direction and the range in which transmission and reception can be performed are increased, and an RFID tag including the antenna pattern.

An aspect of the present invention is an antenna pattern including a base material, and a dipole antenna formed in a band shape, made of a conductive material on a front surface of the base material and extending linearly. The dipole antenna has a connection portion positioned in the middle of the dipole antenna in a longitudinal direction, and to which an IC chip is connected. A pair of long sides of the dipole antenna positioned at both ends of the dipole antenna in a width direction and extending in the longitudinal direction of the dipole antenna are formed in waveform shapes in which a plurality of concave and convex shapes are arranged in the longitudinal direction.

Another aspect of the present invention is an RFID tag including the antenna pattern and an IC chip connected to the connection portion.

According to the present invention, it is possible to easily manufacture the antenna pattern at low cost while the communication distance and the direction and range in which the transmission and reception can be performed are increased.

DETAILED DESCRIPTION OF THE INVENTION

First Embodiment

Hereinafter, a first embodiment of the present invention will be described with reference to FIGS. 1 and 2.

Figure 1:
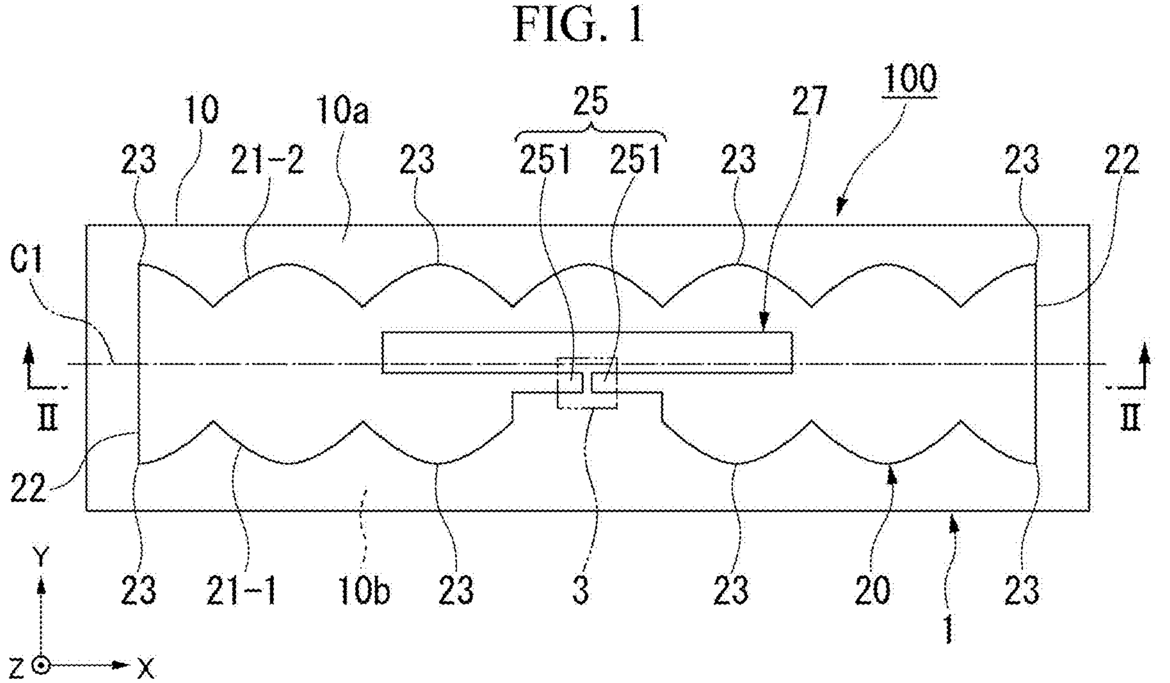
FIG. 1 is a plan view showing an RFID tag including an antenna pattern according to a first embodiment of the present invention.
Figure 2:
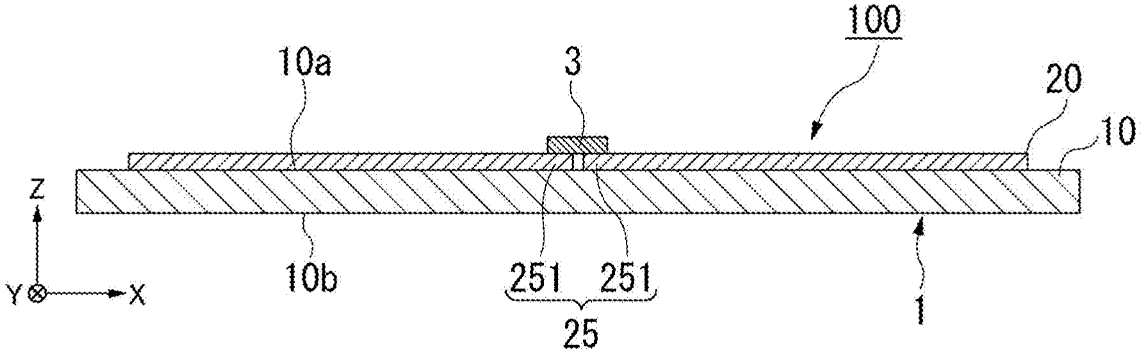
FIG. 2 is a sectional view taken along an arrow direction of line II-II shown in FIG. 1.

As shown in FIGS. 1 and 2, an RFID tag 100 of the present embodiment is an antenna corresponding to a UHF band, and includes an antenna pattern 1 and an IC chip 3. The IC chip 3 is connected to a connection portion 25 (to be described below) of the antenna pattern 1. Although not shown, the IC chip 3 may have a storage unit that stores various types of information such as identification information, a control unit that transmits and receives various types of information, and the like.

The antenna pattern 1 has a base material 10 and a dipole antenna 20.

The base material 10 is formed in a sheet shape or a film shape. Examples of the material applicable to the base material 10 include paper such as high-quality paper and coated paper, a single resin film such as polyvinyl chloride, polyethylene terephthalate, polypropylene, polyethylene, and polyethylene naphthalate, and a multilayer film obtained by stacking a plurality of resin films.

The dipole antenna 20 is made of a conductive material on a front surface 10*a* of the base material 10. The dipole antenna 20 has a band shape that linearly extends on the front surface 10*a* of the base material 10.

In FIGS. 1 and 2, an X-axis direction corresponds to a longitudinal direction of the dipole antenna 20, and a Y-axis direction corresponds to a width direction of the dipole antenna 20. In addition, a Z-axis direction in FIGS. 1 and 2 corresponds to a thickness direction of the base material 10 and the dipole antenna 20.

The dipole antenna 20 is formed in a band shape, and has a pair of long sides 21 (21-1 and 21-2) and a pair of short sides 22. The pair of long sides 21 extends in the longitudinal direction at both ends of the dipole antenna 20 in the width direction. The pair of short sides 22 extends in the width direction at both ends of the dipole antenna 20 in the longitudinal direction. The pair of long sides 21 are formed in waveform shapes in which a plurality of concave and convex shapes that protrude or are recessed in the width direction of the dipole antenna 20 are arranged in the longitudinal direction. In the present embodiment, the pair of short sides 22 extends linearly in the width direction.

The pair of short sides 22 may be formed in, for example, waveform shapes.

In the present embodiment, the concave and convex shape of the waveform shape of each long side 21 is formed as a curve. Specifically, the concave and convex shape is formed as a convex curve. Then, the waveform shape of each long side 21 is formed by arranging a plurality of convex curves in the longitudinal direction.

The concave and convex shape of the waveform shape of each long side 21 of the dipole antenna 20 is not limited to the convex curve, and may be formed as, for example, a concave curve. In addition, the concave and convex shape is not limited to the curve, and may be formed as, for example, a straight line (broken line). In a case where the concave and convex shape is formed as the straight line, a convex portion of the concave and convex shape may be formed in, for example, a triangular shape or a rectangular shape.

In the present embodiment, the waveform shapes of the pair of long sides 21 are formed in a line symmetric with respect to a center line C1 extending in the longitudinal direction in the middle of the dipole antenna 20 in the width direction. Thus, positions of vertices 23 of the convex portions in the longitudinal direction, among the concave and convex shapes, coincide between the pair of long sides 21. In other words, the dipole antenna 20 is formed in a shape similar to a standing wave by the pair of long sides 21 having the waveform shapes. Then, the dipole antenna 20 has a "antinode" portion having the largest dimension in the width direction and a "node" portion having the smallest dimension in the width direction.

In addition, the pair of short sides 22 of the dipole antenna 20 is positioned to correspond to the vertices 23 of the convex portions in the pair of long sides 21. In other words, the pair of short sides 22 is positioned to correspond to "antinode" portions of the dipole antenna 20 formed in a shape similar to a standing wave. Thus, the length of the pair of short sides 22 coincide to the maximum dimension of the dipole antenna 20 in the width direction.

In the present embodiment, the number of convex portions (convex curves) forming the waveform shape is different between the pair of long sides 21. Specifically, the number of convex portions in a first long side 21-1 positioned on a Y-axis negative direction side of the pair of long sides 21 is one less than the number of convex portions in a second long side 21-2 positioned on a Y-axis positive direction side. A convex portion corresponding to one convex portion positioned in an intermediate portion of the second long side 21-2 in the longitudinal direction is not formed on the first long side 21-1. In other words, the waveform shape of the first long side 21-1 is divided in the intermediate portion in the longitudinal direction.

The dipole antenna 20 has the connection portion 25 to which the IC chip 3 is connected. The connection portion 25 is positioned in the middle of the dipole antenna 20 in the longitudinal direction. The connection portion 25 has a pair of terminals 251 positioned at an interval in the longitudinal direction. The pair of terminals 251 are connected to electrodes (not shown) of the IC chip 3. The connection portion 25 is positioned at a portion recessed inward (Y-axis positive direction side) from the first long side 21-1 of the dipole antenna 20 at the intermediate portion in the longitudinal direction. That is, a position of the connection portion 25 corresponds to the position of the first long side 21-1 where the convex portion is not formed.

In the dipole antenna 20, a slit 27 extending in the longitudinal direction inside the dipole antenna 20 is formed in plan view of the base material 10 in the thickness direction. The slit 27 extends line-symmetrically in the longitudinal direction from the intermediate portion in the longitudinal direction. The slit 27 is positioned adjacent to the connection portion 25 in the width direction. Specifically, the slit 27 is positioned adjacent to the Y-axis positive direction side of the connection portion 25. The slit 27 constitutes a matching circuit that adjusts an impedance in the antenna pattern 1. The impedance can be adjusted by adjusting a length of the slit 27 in the longitudinal direction.

In the present embodiment, a dimension (antenna length) of the dipole antenna 20 in the longitudinal direction is set to a half wavelength (λ/2) of a design frequency. That is, the dipole antenna 20 is a half-wave dipole antenna. The "design frequency" in the present embodiment is a frequency in the UHF band.

The dipole antenna 20 is the half-wave dipole antenna, and thus, the dipole antenna 20 and transmitted radio waves are in a resonance state. As a result, the maximum power can be received.

In the antenna pattern 1 of the present embodiment and the RFID tag 100 including the antenna pattern 1, the pair of long sides 21 of the dipole antenna 20 is formed in the waveform shapes. Accordingly, it is possible to increase the communication distance of the radio waves and the direction and the range in which transmission and reception can be performed (expand communication area). In addition, even though sub-elements are not provided on a back surface 10*b* of the base material 10 as in the antenna pattern 1 of Japanese Patent No. 6941069, it is possible to increase the communication distance and the direction and the range in which transmission and reception can be performed. Accordingly, the antenna pattern 1 can be manufactured at low cost and easily.

In addition, in the antenna pattern 1 of the present embodiment, the pair of long sides 21 of the dipole antenna 20 is formed in the waveform shapes. Thus, a length of a peripheral edge (outer peripheral portion) of the dipole antenna 20 including the pair of long sides 21 and the short side 22 can be increased without changing a size of the dipole antenna 20, as compared with a case where the pair of long sides 21 is linearly formed in the longitudinal direction. Here, the length of the peripheral edge (outer peripheral portion) of the dipole antenna 20 is related to a frequency of the radio waves that can be transmitted and received in the antenna pattern 1. Specifically, as a frequency of radio waves to be transmitted and received in the antenna pattern 1 is lower, it is necessary to increase the length of the peripheral edge (outer peripheral portion) of the dipole antenna 20. In other words, as the length of the peripheral edge (outer peripheral portion) of the dipole antenna 20 increases, the frequency (resonance frequency of the antenna pattern 1) of the radio waves easily transmitted and received decreases. In addition, as the number of concave and convex shapes of the waveform shape of the long side 21 increases, the frequency (the resonance frequency of the antenna pattern 1) of the radio waves easily transmitted and received decreases. As a results, in the antenna pattern 1 of the present embodiment, radio waves in a lower frequency band can be transmitted and received without changing the size of the dipole antenna 20. In other words, it is possible to reduce the size of the antenna pattern 1 capable of transmitting and receiving the radio waves having a desired frequency.

In addition, in the antenna pattern 1 of the present embodiment, the pair of short sides 22 of the dipole antenna 20 are positioned to correspond to the vertices 23 of the convex portions in the pair of long sides 21. As a result, the length of the pair of short sides 22 can be set to be longest. Accordingly, in the dipole antenna 20, the radio waves are easily transmitted and received in a direction (longitudinal direction) in which the short side 22 faces. That is, the dipole antenna 20 can perform wireless communication favorably even in the longitudinal direction.

In addition, in the antenna pattern 1 of the present embodiment, the concave and convex shape constituting the waveform shape of each long side 21 is formed as the curve. Thus, the length of the peripheral edge (outer peripheral portion) of the dipole antenna 20 can be set to be longer than in a case where the concave and convex shape is formed as only the straight line (broken line). Accordingly, it is possible to further expand the communication area of the radio waves.

In addition, in the antenna pattern 1 of the present embodiment, the concave and convex shape constituting the waveform shape of each long side 21 is formed as the convex curve. Thus, in a case where the dimensions of the dipole antenna 20 in the longitudinal direction and the width direction are the same as in a case where the concave and convex shape is formed as the concave curve, an area of the dipole antenna 20 can be further increased. Accordingly, wireless communication can be performed more favorably.

In addition, in the antenna pattern 1 of the present embodiment and the RFID tag 100 including the antenna pattern 1, even though the RFID tag 100 is attached to an adherend such as clothing, which is a dielectric, a frequency shift in which the resonance frequency (frequency peak) of the antenna pattern 1 shifts to a low frequency side can be suppressed to be small. Hereinafter, this point will be described.

Communication characteristics of the antenna pattern are strongly influenced by the adherend, which is the dielectric adjacent to the antenna pattern, and the resonance frequency (frequency peak) is easily shifted to the low frequency side depending on characteristics of a dielectric constant of the adherend. Since frequency bands available in countries including Japan and Europe are determined, in a case where the frequency characteristics of the antenna pattern greatly change depending on the dielectric constant of the adherend, information of the RFID tag is less likely to be read.

On the other hand, in the RFID tag 100 including the antenna pattern 1 of the present embodiment, since the frequency shift of the antenna pattern 1 can be suppressed to be small, the dielectric constant of the adherend is less likely to be influenced, and the information of the RFID tag 100 can be easily read.

In addition, the frequency shift of the antenna pattern 1 caused by the adherend which is the dielectric is small, and thus, it is possible to perform an antenna design suitable for various dielectrics (adherends) only by changing the matching circuit (the length of the slit 27) without changing the antenna length of the dipole antenna 20. For example, the resonance frequency (frequency peak) of the antenna pattern 1 can be changed by changing the length of the slit 27. Specifically, the resonance frequency (frequency peak) of the antenna pattern 1 can be shifted to the low frequency side by increasing the length of the slit 27.

Specific examples of the above-described "dielectric" include water and resin in addition to clothing. In a case where the dielectric is water, a container containing water as the dielectric is used as an example of the "adherend" described above. In the RFID tag 100 of the present embodiment, even though the dielectric is water, the above-described effects are sufficiently exhibited.

In addition, in the antenna pattern 1 of the present embodiment and the RFID tag 100 including the antenna pattern 1, even though the RFID tag 100 is attached to a plurality of articles that can be stacked, such as files, documents, books, and comics, and even though the plurality of articles are stacked, that is, even though a plurality of RFID tags 100 are in proximity to each other, information on the plurality of RFID tags 100 can be easily read, and missing of RFID can be suppressed.

Figure 3:
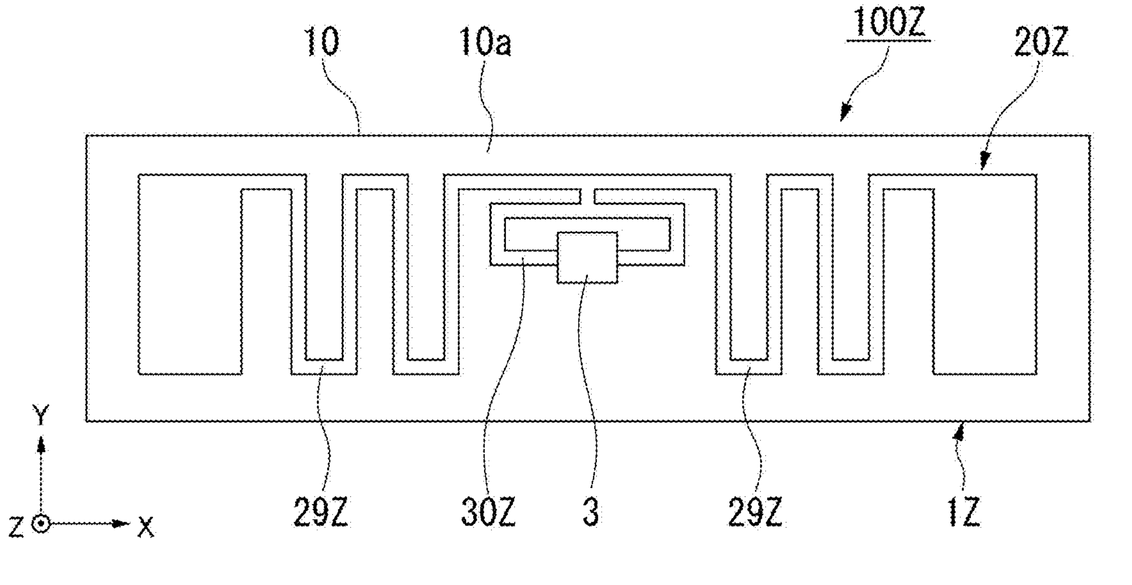
FIG. 3 is a plan view showing an RFID tag including an antenna pattern of related art.

Hereinafter, the effects of the antenna pattern 1 (hereinafter, referred to as an example antenna 1) of the embodiment shown in FIG. 1 will be described in comparison with an antenna pattern 1Z of the related art (hereinafter, referred to as a comparative example antenna 1Z) shown in FIG. 3. The comparative example antenna 1Z shown in FIG. 3 is formed by providing a loop wiring 30Z constituting a matching circuit and a dipole antenna 20Z connected to the loop wiring 30Z and extending from the loop wiring 30Z in a line-symmetrical manner on the front surface **10*a* of the base material 10. In the comparative example antenna 1Z, the dipole antenna 20Z includes a meander 29Z. The comparative example antenna 1Z is formed by implementing the IC chip 3 on the loop wiring 30Z to constitute an RFID tag 100Z** of the related art.

(Influence of Dielectric)

Frequency characteristics were measured in a state where each of the example antenna 1 and the comparative example antenna 1Z was brought close to the dielectric (the adherend). As a result, it was found that the example antenna 1 had a shift in a resonance frequency (frequency peak) of about 60 MHz smaller than in the comparative example antenna 1Z. Accordingly, it was clarified that in the example antenna 1, the frequency shift due to the dielectric constant of the dielectric (the adherend) can be reduced.

(Directivity of Antenna)

For the example antenna 1 and the comparative example antenna 1Z, the directivity of the antenna when the antenna was rotated by 360 degrees with respect to the long side 21 at an angle at which a polarization plane was horizontal is set to 0 degrees by using a frequency in the 920 MHz band was evaluated. As a result, in the example antenna 1, a gain is higher by about 4 dB at a minimum operating power as compared with the comparative example antenna 1Z at 90 degrees and 270 degrees at which the polarization plane is horizontal with respect to the short side 22. In addition, at 90 degrees and 270 degrees, a communication distance in the comparative example antenna 1Z was 0 m, but a communication distance in the example antenna 1 was 5 m. As described above, in the example antenna 1, it is clarified that radio waves are easily transmitted and received even in the longitudinal direction (the direction in which the short side 22 faces), and thus, radio waves are easily transmitted and received at any angle as compared with the comparative example antenna 1Z.

(Stacking Performance)

Stacking performance when a plurality of layers were stacked by using two types of RFID tags including the example antenna 1 and the comparative example antenna 1Z was evaluated. Specifically, for each of the example antenna 1 and the comparative example antenna 1Z, the RFID tags were attached to identical portions inside books, and 10 books were stacked. Then, the RFID tags attached to 10 books were read by a handy reader to verify reading rates of the example antenna 1 and the comparative example antenna 1Z. As a result, the reading rate of the example antenna 1 was improved by 30% with respect to the reading rate of the comparative example antenna 1Z. Thus, it was clarified that the example antenna 1 has more excellent stacking performance than the comparative example antenna 1Z.

In addition, reading distances of the example antenna 1 and the comparative example antenna 1Z were verified by reading the RFID tags attached to 10 books with the handy reader. As a result, in a case where a radio wave power of the handy reader was set to 30 dBm, the reading distance of the example antenna 1 was about 30% longer than the reading distance of the comparative example antenna 1Z. Thus, it is clarified that the example antenna 1 has more excellent stacking performance than the comparative example antenna 1Z.

Second Embodiment

Next, a second embodiment of the present invention will be described with reference to FIG. 4. In the following description, the configurations that are the same as the configurations already described will be given the same reference signs, and duplicate descriptions thereof will be omitted.

Figure 4:
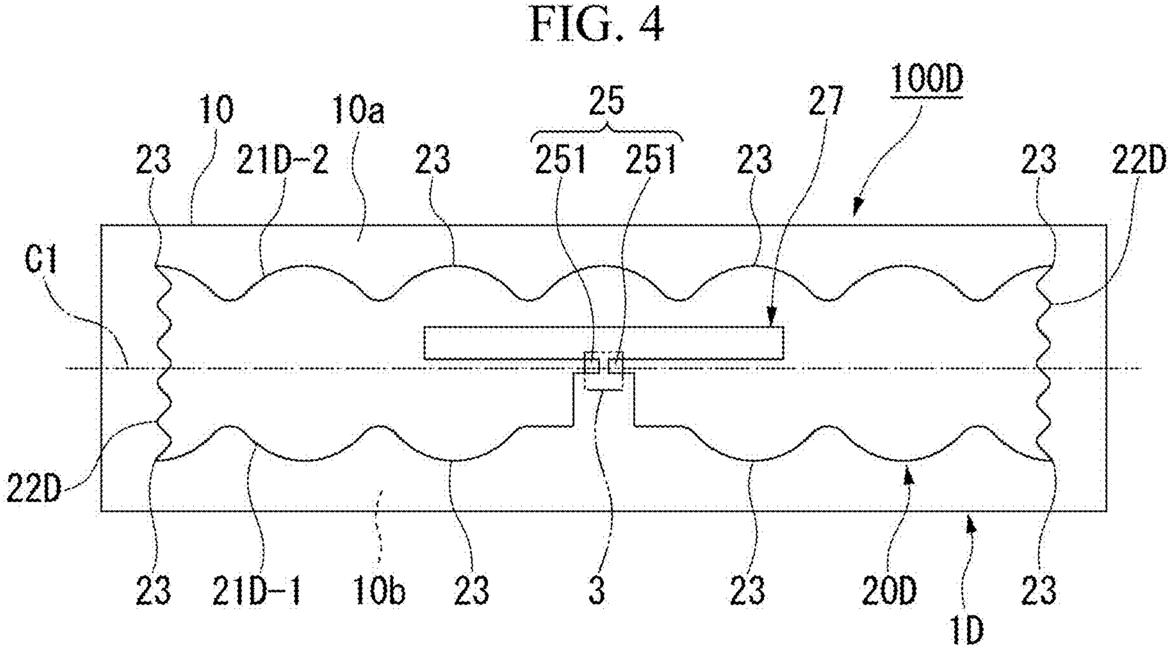
FIG. 4 is a plan view showing an RFID tag including an antenna pattern according to a second embodiment of the present invention.

As shown in FIG. 4, an RFID tag 100D of the second embodiment includes an antenna pattern 1D and an IC chip 3 as in the first embodiment. The antenna pattern 1D of the second embodiment has a base material 10 and a dipole antenna 20D, as in the first embodiment. In the second embodiment, an aspect of waveform shapes of a pair of long sides 21D (21D-1 and 21D-2) and an aspect of waveform shapes of a pair of short sides 22D of the dipole antenna 20D are different from the aspects in the first embodiment.

As in the first embodiment, the pair of long sides 21D of the second embodiment is formed in waveform shapes in which a plurality of concave and convex shapes that protrude or are recessed in a width direction (Y-axis direction) of the dipole antenna 20D are arranged in a longitudinal direction (X-axis direction). In addition, the waveform shapes of the pair of long sides 21D are formed in a line symmetric with respect to a center line C1.

However, in the second embodiment, the concave and convex shape of the waveform shape of each long side 21D are a convex curve or a concave curve. Then, the waveform shape of each long side 21D is formed by alternately arranging the convex curve and the concave curve in the longitudinal direction. Thus, the waveform shape of each long side 21D is formed in a shape in which adjacent concave and convex shapes are smoothly connected.

The pair of short sides 22D of the second embodiment is formed in waveform shapes including concave and convex shapes that protrude or are recessed in a longitudinal direction of the dipole antenna 20D. In FIG. 4, the plurality of concave and convex shapes of the waveform shape of each short side 22D are arranged in a width direction. In addition, the concave and convex shape is a convex curve or a concave curve. The waveform shape of each short side 22D is formed by alternately arranging the convex curve and the concave curve in the longitudinal direction.

The antenna pattern 1D and the RFID tag 100D of the second embodiment exhibit effects similar to the effects of the first embodiment.

In the configuration of the second embodiment in which the short side 22D of the dipole antenna 20D is formed in the waveform shape, antenna performance (communication distance and frequency characteristics) similar to the configuration of the first embodiment in which the short side 22 (see FIG. 1) is linearly formed can be obtained.

In the second embodiment, the concave and convex shape of the waveform shape of each short side 22D may include, for example, only the convex curve or only the concave curve. In addition, the concave and convex shape is not limited to the curve, and may be formed as, for example, a straight line (broken line). In a case where the concave and convex shape is formed as the straight line, a convex portion of the concave and convex shape may be formed in, for example, a triangular shape or a rectangular shape.

In the second embodiment, the number of concave and convex shapes constituting the waveform shape of each short side 22D may be, for example, one. That is, the waveform shape of each short side 22D may include, for example, only one convex curve or one concave curve.

The waveform shape of each long side 21D of the second embodiment is not limited to the shape shown in FIG. 4, and may be, for example, the shape shown in the first embodiment.

The waveform shape of each long side 21D shown in FIG. 4 may be applied to the dipole antenna 20 of the first embodiment.

Third Embodiment

Next, a third embodiment of the present invention will be described with reference to FIG. 5. In the following description, the configurations that are the same as the configurations already described will be given the same reference signs, and duplicate descriptions thereof will be omitted.

Figure 5:
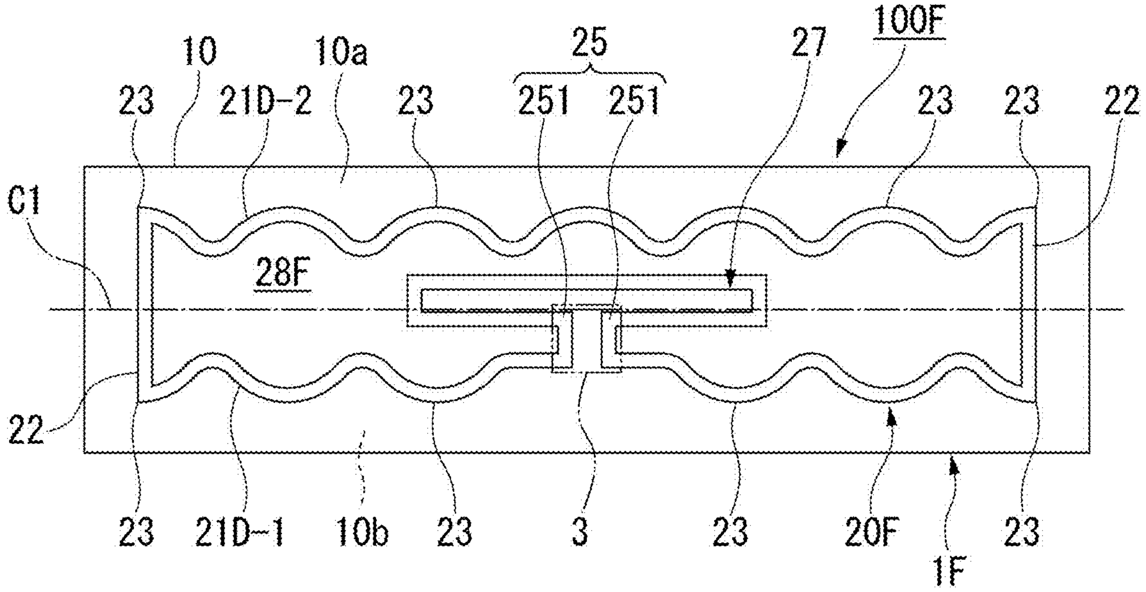
FIG. 5 is a plan view showing an RFID tag including an antenna pattern according to a third embodiment of the present invention.

As shown in FIG. 5, an RFID tag 100F of the third embodiment includes an antenna pattern 1F and an IC chip 3, as in the first embodiment. The antenna pattern 1F of the third embodiment has a base material 10 and a dipole antenna 20F, as in the first embodiment. A long side and a short side of the dipole antenna 20F of the third embodiment may be formed in any of the shapes described in the first and second embodiments. The dipole antenna 20F shown in FIG. 5 has a long side 21D having the same shape as the shape of the second embodiment and a short side 22 having the same shape as the shape of the first embodiment.

In the third embodiment, a cavity 28F is formed inside a peripheral edge of the dipole antenna 20F. The cavity 28F is formed by penetrating the dipole antenna 20F in a thickness direction (Z-axis direction). The "peripheral edge of the dipole antenna 20F" includes an edge of a connection portion 25 (terminal 251) connected to a first long side 21D-1 and an inner edge of a slit 27 connected to an edge of the connection portion 25, in addition to the pair of long sides 21D and the pair of short sides 22.

The shape and the size of the cavity 28F viewed from the thickness direction may be optional. In the dipole antenna 20F shown in FIG. 5, a peripheral edge of the cavity 28F is formed along the peripheral edge of the dipole antenna 20F. Thus, the dipole antenna 20F in FIG. 5 is formed in a band shape (or an annular shape) extending along the peripheral edge of the dipole antenna 20F.

The antenna pattern 1F and the RFID tag 100F of the third embodiment exhibit effects similar to the effects of the first embodiment.

In addition, in the antenna pattern 1F of the third embodiment, since the cavity 28F is formed inside the peripheral edge of the dipole antenna 20F, the dipole antenna 20F can be formed with a smaller amount of material as compared with a dipole antenna without the cavity 28F (for example, the dipole antennas 20 and 20D shown in FIGS. 1 and 4). For example, in a case where the dipole antenna 20F is formed on a front surface 10*a* of the base material 10 by printing (for example, screen printing), the amount of ink used for printing the dipole antenna 20F can be reduced. Accordingly, manufacturing cost of the dipole antenna 20F can be reduced.

In the dipole antenna 20F having the cavity 28F, it is possible to secure the maximum communication distance (communication distance at the frequency peak) equivalent to the maximum communication distance of the dipole antenna without the cavity 28F.

While preferred embodiments of the invention have been described and illustrated above, it should be understood that these are exemplary examples of the invention and are not to be considered as limiting. Additions, omissions, substitutions, and other modifications can be made without departing from the scope of the invention. Accordingly, the invention is not to be considered as being limited by the foregoing description and is only limited by the scope of the appended claims.

The RFID tag of the present invention is not limited to the tag corresponding to the UHF band, and may correspond to any frequency band.

What is claimed is:

1. An antenna pattern comprising:

a base material; and a dipole antenna formed in a band shape, made of a conductive material on a front surface of the base material, and extending linearly, wherein the dipole antenna has a connection portion positioned in a middle of the dipole antenna in a longitudinal direction, and to which an IC chip is connected, a pair of long sides of the dipole antenna positioned at both ends of the dipole antenna in a width direction and extending in the longitudinal direction of the dipole antenna are formed in waveform shapes in which a plurality of concave and convex shapes are arranged in the longitudinal direction, and the waveform shapes of the pair of long sides are formed line symmetric with respect to a center line extending in the longitudinal direction in the middle of the dipole antenna in the width direction.

2. The antenna pattern according to claim 1, wherein a pair of short sides of the dipole antenna positioned at both ends in the longitudinal direction and extending in the width direction are positioned to correspond to vertices of convex portions, among the concave and convex shapes of the pair of long sides.

3. The antenna pattern according to claim 2, wherein the concave and convex shape is formed as a curve.

4. The antenna pattern according to claim 2, wherein the concave and convex shape is formed as a convex curve.

5. The antenna pattern according to claim 2, wherein a pair of short sides of the dipole antenna positioned at both ends in the longitudinal direction and extending in the width direction are formed in waveform shapes including concave and convex shapes that protrude or are recessed in the longitudinal direction.

6. The antenna pattern according to claim 2, wherein a cavity is formed inside a peripheral edge of the dipole antenna.

7. The antenna pattern according to claim 2, wherein the antenna pattern is included in an RFID tag that further includes an IC chip connected to the connection portion.

8. The antenna pattern according to claim 1, wherein the concave and convex shape is formed as a curve.

9. The antenna pattern according to claim 1, wherein the concave and convex shape is formed as a convex curve.

10. The antenna pattern according to claim 1, wherein a pair of short sides of the dipole antenna positioned at both ends in the longitudinal direction and extending in the width direction are formed in waveform shapes including concave and convex shapes that protrude or are recessed in the longitudinal direction.

11. The antenna pattern according to claim 1, wherein the antenna pattern is included in an RFID tag that further includes an IC chip connected to the connection portion.

12. An antenna pattern comprising:

a base material; and a dipole antenna formed in a band shape, made of a conductive material on a front surface of the base material, and extending linearly, wherein the dipole antenna has a connection portion positioned in a middle of the dipole antenna in a longitudinal direction, and to which an IC chip is connected, a pair of long sides of the dipole antenna positioned at both ends of the dipole antenna in a width direction and extending in the longitudinal direction of the dipole antenna are formed in waveform shapes in which a plurality of concave and convex shapes are arranged in the longitudinal direction, and a cavity is formed inside a peripheral edge of the dipole antenna.

* * * * *